US008963687B2

(12) United States Patent
Tijink et al.

(10) Patent No.: US 8,963,687 B2
(45) Date of Patent: Feb. 24, 2015

(54) SYSTEM AND METHOD FOR DSRC COMMUNICATION

(75) Inventors: Jasja Tijink, Breitenfurt (AT);
Refi-Tugrul Güner, Baden (AT); Georg Karner, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 709 days.

(21) Appl. No.: 13/014,540

(22) Filed: Jan. 26, 2011

(65) Prior Publication Data

US 2011/0187506 A1    Aug. 4, 2011

(30) Foreign Application Priority Data

Jan. 29, 2010   (EP) .................................... 10450009

(51) Int. Cl.
| | | |
|---|---|---|
| *H04Q 5/22* | (2006.01) | |
| *G08G 1/00* | (2006.01) | |
| *H04L 9/32* | (2006.01) | |
| *G08B 1/08* | (2006.01) | |
| *H04N 7/167* | (2011.01) | |
| *H04K 1/00* | (2006.01) | |
| *H04L 29/06* | (2006.01) | |
| *G07B 15/06* | (2011.01) | |
| *H04W 4/00* | (2009.01) | |

(52) U.S. Cl.
CPC ............ *H04L 63/062* (2013.01); *G07B 15/063* (2013.01); *H04W 4/008* (2013.01)
USPC ...... 340/10.1; 340/928; 340/5.26; 340/539.1; 380/225; 380/270

(58) Field of Classification Search
CPC ............................ G07C 9/00182; G08G 1/042
USPC ........................................................ 340/5.26
See application file for complete search history.

(56) References Cited

U.S. PATENT DOCUMENTS

| | | | | |
|---|---|---|---|---|
| 5,310,999 A | * | 5/1994 | Claus et al. .................... | 235/384 |
| 5,554,984 A | * | 9/1996 | Shigenaga et al. ............. | 340/937 |
| 5,926,546 A | * | 7/1999 | Maeda et al. ................... | 705/65 |
| 6,185,307 B1 | * | 2/2001 | Johnson, Jr. .................. | 380/270 |

(Continued)

FOREIGN PATENT DOCUMENTS

EP          0 769 763 A2     4/1997

OTHER PUBLICATIONS

Extended European Search Report for corresponding European Patent Application No. 10 450 009.5, dated May 17, 2010, 8pp.

(Continued)

*Primary Examiner* — Daniel Wu
*Assistant Examiner* — Mohamed Barakat
(74) *Attorney, Agent, or Firm* — Fiala & Weaver P.L.L.C.

(57) ABSTRACT

A system and method for Dedicated Short-Range Communication (DSRC) between beacons and onboard units of a road toll system, wherein the beacons have a system-wide key and the onboard units have only individual keys, which are respectively formed from the system-wide key on the basis of a derivation code specific to the onboard units, wherein upon a communication from the onboard unit the derivation code is transmitted to the beacon in order to enable the beacon to emulate the individual key to encrypt/decrypt the communication with the onboard unit and/or for access to data stored in the onboard unit, and wherein upon communications with consecutive beacons the onboard unit transmits varying derivation codes.

10 Claims, 2 Drawing Sheets

(56) References Cited

U.S. PATENT DOCUMENTS

| | | | |
|---|---|---|---|
| 6,300,882 B1* | 10/2001 | Inoue | 340/933 |
| 6,654,883 B1* | 11/2003 | Tatebayashi | 713/168 |
| 6,711,400 B1* | 3/2004 | Aura | 455/411 |
| 7,062,239 B2* | 6/2006 | Inoue | 455/166.2 |
| 7,176,810 B2* | 2/2007 | Inoue | 340/905 |
| 7,382,275 B2* | 6/2008 | Feldman et al. | 340/904 |
| 7,501,961 B2* | 3/2009 | Robinson et al. | 340/928 |
| 2003/0063742 A1* | 4/2003 | Neufeld et al. | 380/46 |
| 2008/0056495 A1* | 3/2008 | Eguchi et al. | 380/270 |

OTHER PUBLICATIONS

Jiang et al.; BAT: A Robust Signature Scheme for Vehicular Networks Using Binary Authentication Tree; IEEE Transactions on Wireless Communications, vol. 8, No. 4, Apr. 2009; pp. 1974-1983.

European Commission—DG INFSO; CARDME-4; Project IST-1999-29053, Deliverable 4.1 (Final), Jun. 1, 2002, 112pp.

Raya, Maxim et al.; The Security of Vehicular Ad Hoc Networks; SASN'05, Nov. 7, 2005, ACM 1-59593-227; pp. 11-21.

* cited by examiner

SYSTEM AND METHOD FOR DSRC COMMUNICATION

CROSS-REFERENCE TO RELATED APPLICATION(S)

This application claims priority to European Patent Application No. 10 450 009.5, filed on Jan. 29, 2010, the contents of which are hereby expressly incorporated by reference.

FIELD OF INVENTION

The present invention relates to radio communications, and more specifically to a system and method for Dedicated Short-Range Communication (DSRC) between beacons and onboard units of a road toll system.

BACKGROUND

Dedicated Short-Range Communication (DSRC) road toll systems are standardised in ISO 14906 and EN 15509 standards, for example. DSRC communication at the radio interface can occur, for example, in accordance with the WAVE standard IEEE 1609.11. For security reasons, system-wide keys (master keys) are not stored in the onboard units (OBUs) in such DSRC road toll systems. Instead the OBUs receive only individual keys derived therefrom (derived keys). Only these individual keys are transmitted or used via the DSRC radio interface.

The derivation code required for this, referred to as "key diversifier" in the ISO 14906 and EC 15509 standards, represents an individual identifier for each onboard unit for the respectively used rule for derivation of the individual key (derived key) from the system-wide key (master key). According to the prior art, the derivation code (key diversifier) is notified in any communication between an onboard unit and a beacon from the onboard unit to the beacon, so that the latter can derive (emulate) the respective individual key of the onboard unit from the system-wide key "on the fly" for communication with or access to the onboard unit.

This configuration encompasses a data protection problem. Since in every DSRC radio communication the—onboard unit specific—derivation code is firstly transmitted from the onboard unit via the radio interface by tapping the radio interface or by targeted fraudulent readout of a passing onboard unit.

SUMMARY

The present invention solves this data protection problem that has been recognised for the first time here in that upon communications with consecutive beacons the onboard unit transmits varying derivation codes. In this way, it is no longer possible to track onboard units over a longer period of time or beyond multiple beacon sections on the basis of the derivation codes transmitted by these units in DSRC communications.

According to some embodiments of the invention, as part of a communication with an onboard unit, the beacon transmits thereto at least one new individual key and associated derivation code pair, which the onboard unit uses in a subsequent communication. As a result of this, the derivation codes are continuously changed on the path of the onboard unit beyond multiple beacon sections.

In some embodiments, the beacon transmits the pair at the end of the communication. In some embodiments, the beacon transmits the pair only in the case of low current communication occurrence (depending on traffic) so as not to impair its toll calculation functions as a result of the additional data protection functions.

In some embodiments, a pool of pairs of individual keys and associated derivation codes is stored in an onboard unit and as part of a communication with a beacon the onboard unit selects a pair from this pool and uses it for this communication. This reduces the load on the beacons and does not require any change in or addition to the communication protocol on the radio interface, but does require appropriate memories and additional functionality in the onboard units. In some embodiments, the pair is selected randomly, or pseudo-randomly from the pool in the onboard unit.

In some embodiments, as part of a communication with an onboard unit, the beacon transmits thereto at least one individual key and associated derivation code pair, which the onboard unit stores in its pool. High data protection security can be achieved as a result of this, because the derivation code changes frequently and at the same time the additional load of the beacons and the radio interfaces is reduced.

In some embodiments, the invention is suitable for communications in accordance with the DSRC standard, EN 15509 standard, or standards based thereon, wherein the derivation code is the key diversifier of this standard.

DETAILED DESCRIPTION

The present invention relates to a system and method for DSRC communication between beacons and onboard units of a road toll system, where the beacons have a system-wide key and the onboard units have only individual keys. In some embodiments, the individual keys are respectively formed from the system-wide key on the basis of a derivation code specific to the onboard units. Upon a communication from the onboard unit the derivation code is transmitted to the beacon in order to enable the beacon to derive (emulate) the individual key to encrypt and/or decrypt (en/decrypt) the communication with the onboard unit and/or for access to data stored in the onboard unit.

In some embodiments, the present invention is a method for DSRC communication between a plurality of beacons and a plurality of onboard units of a road toll system. The method includes: providing the plurality of the beacons with a system-wide key and providing each of the plurality of the onboard units with a respective individual key formed from the system-wide key, respectively on the basis of a derivation code specific to a respective onboard unit. Upon a first communication from an onboard unit to a first beacon, the method transmits the derivation code of said onboard unit to the first beacon to enable the first beacon to emulate the individual key of the onboard unit for en/decrypting said first communication with said onboard unit, or for accessing data stored in said onboard unit. Upon a second communication from said onboard unit to a second beacon, the method varies the derivation code to obtain a second derivation code; and transmits the second derivation code to the second beacon to enable the second beacon to emulate the individual key for said onboard unit for en/decrypting said second communication with said onboard unit, or for accessing data stored in said onboard unit.

Figure 1:
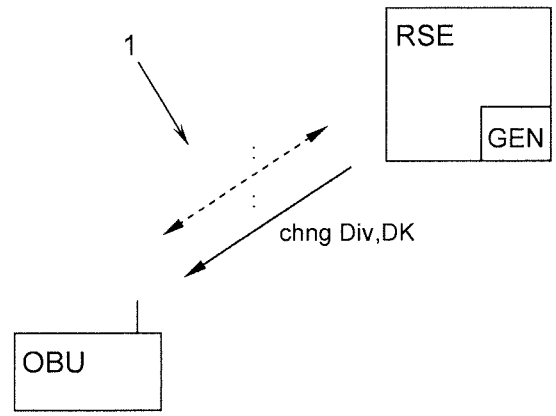
FIG. 1 is an exemplary block diagram, according to some embodiments of the present invention.
Figure 2:
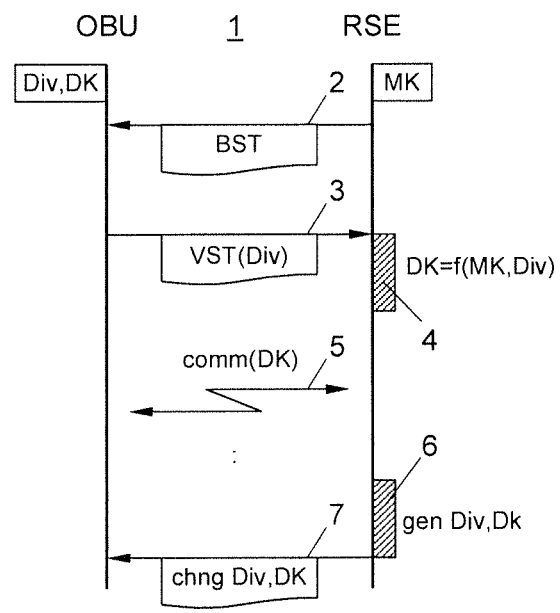
FIG. 2 is an exemplary process flow diagram, according to some embodiments of the present invention.

An exemplary onboard unit OBU and an exemplary beacon RSE (roadside equipment) of a road toll system with a plurality of onboard units OBU and beacons RSE are shown in FIGS. 1 to 4. The onboard units OBU and beacons RSE communicate with one another via a respective short-range radio interface 1 in accordance with the DSRC (dedicated short-range communication) standard, in particular in accordance with standard ISO 14906 or EN 15509 or standards based thereon or compatible therewith. Two different embodiments of a DSRC communication method according to the invention on the radio interface 1 are shown in FIGS. 1 and 2, on the one hand, and FIGS. 3 and 4, on the other.

In both variants the beacons RSE respectively have one or more system-wide keys MK (master keys). For example, they connect to a central unit (not shown), which manages the system-wide key or keys MK for the beacons RSE or distributes this/these to the beacons.

For security reasons, a system-wide key MK is not stored in the onboard units OBU. Instead, the onboard units OBU only hold keys DK (derived keys) derived individually therefrom. The individual keys DK can be used for encryption of the communication at the radio interface 1 (as encryption keys) and/or for access authorisation (as access credential keys) for access to data stored in the onboard unit OBU, as known to the person skilled in the art.

The individual keys DK are derived from the system-wide key MK according to a given differentiation rule. The derivation code (key diversifier) Div identifies the respective onboard unit-specific derivation rules used or is a parameter of these derivation rules, i.e.

$$DK = f(MK, \text{Div})\qquad\text{Eq. (1)}$$

where, the individual key DK can only be formed from a system-wide key MK with knowledge of the derivation code Div.

According to a variant of the embodiments of FIGS. 1 and 2, the beacon RSE transmits its service table BST (beacon service table) to a passing onboard unit OBU (2). The onboard unit OBU answers in response with its own service table VST (vehicle service table), which also contains its current derivation code Div (3). The beacon RSE can now derive (emulate) the individual key DK of the respective onboard unit OBU from the system-wide key MK, on the basis of the derivation code Div (4) and use it for further communication, for example, as encryption key or access credential key (5).

At the end of the communication (5), the beacon RSE generates a new derivation code Div, for example, in a random-controlled manner, and calculates the associated individual key DK (6). The beacon RSE then transmits this pair (Div, DK) to the onboard unit OBU (7). The onboard unit OBU stores the received pair (Div, DK) in order to use it in the next or at least one of the next communications (2-5), whether with this or another beacon RSE on its route.

Figure 3:
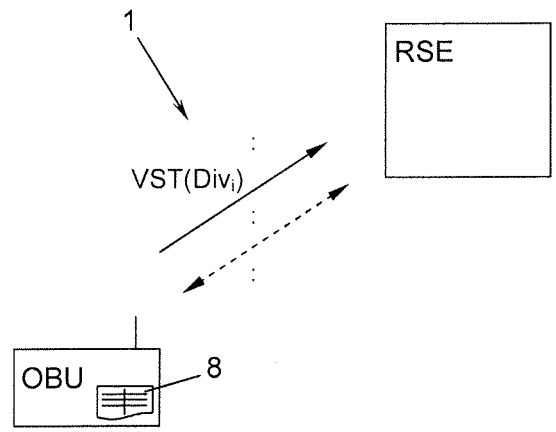
FIG. 3 is an exemplary block diagram, according to some embodiments of the present invention.
Figure 4:
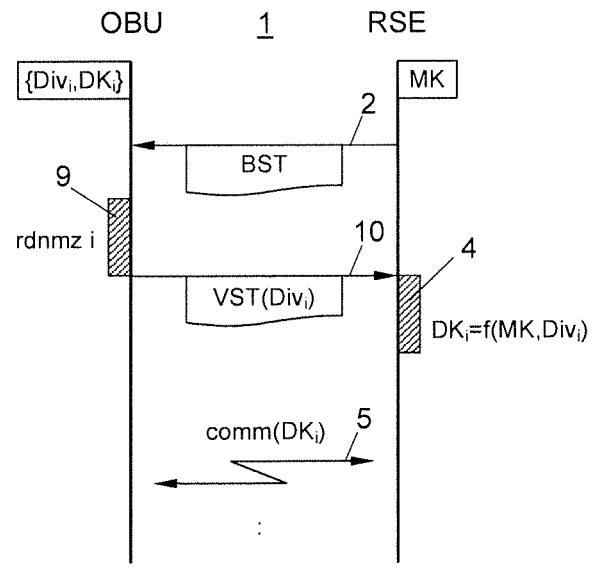
FIG. 4 is an exemplary process flow diagram, according to some embodiments of the present invention.

FIGS. 3 and 4 show some embodiments, wherein the same reference numbers relate to similar elements. The onboard unit OBU here contains a pool 8 of pairs of different derivation codes $Div_i$ and associated individual keys $DK_i$. The pool 8 can be calculated from the system-wide key MK in advance, for example, during initialisation or output of an onboard unit OBU in a programming station OPS (OBU programming station) and stored in the onboard unit OBU.

After the BST request by the beacon RSE, the onboard unit OBU selects (9) a pair ($Div_i$, $DK_i$) in a random manner (randomize i), or in a pseudo-random manner, from its pool 8 and transmits the derivation code $Div_i$ of the selected pair in the VST response to the beacon RSE (10). Alternatively, the pair ($Div_i$, $DK_i$) could also be selected from the list of pairs in the pool 8 according to specific rules. For example, the respective oldest pair or earliest used pair first. The beacon RSE can now derive the associated individual keys $DK_i$ from the system-wide key MK and the received derivation code $Div_i$ (4) and use it for further communication (5).

The embodiments of FIGS. 1, 2 and 3, 4 can be optionally combined. For example, the beacon RSE could generate a new pair ($Div_i$, $DK_i$) in a similar manner to (6) and, in a similar manner to (7), transmit it to the onboard unit OBU, to replace a pair already used or in addition to the pairs present. The onboard unit OBU then stores the received pair ($Div_i$, $DK_i$) in its pool 8 for further use. This may be done at the end of a communication (5), if the beacon RSE has sufficient time, that is, when the communication traffic occurring with this and other onboard units OBU is in fact light, to replace a pair already used or in addition to the pairs present.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for Dedicated Short-Range Communication (DSRC) communication between a plurality of beacons and one of a plurality of onboard units of a road toll system, the method comprising:

providing the plurality of the beacons with a system-wide key;

providing each of the plurality of the onboard units with a respective individual key formed from the system-wide key on the basis of a derivation code specific to a respective onboard unit, the system-wide key not being stored in the onboard units;

upon a first communication from an onboard unit to a first beacon, transmitting the derivation code of said onboard unit to the first beacon to enable the first beacon to emulate the individual key of the onboard unit for encryption/decrypting said first communication with said onboard unit, or for accessing data stored in said onboard unit;

upon a second communication from said onboard unit to a second beacon, varying the derivation code to obtain a second derivation code; and transmitting the second derivation code to the second beacon to enable the second beacon to emulate a second individual key for said onboard unit for encryption/decrypting said second communication with said onboard unit, or for accessing data stored in said onboard unit, wherein, as part of the first communication with said onboard unit, the first beacon transmits thereto at least one new individual key and associated derivation code pair, which the onboard unit uses in said second communication with said second beacon.

2. The method according to claim 1, wherein the first beacon transmits said at least one new individual key and associated derivation code pair at the end of the first communication.

3. The method according to claim 1, wherein the first beacon transmits said at least one new individual key and associated derivation code pair only in the case of low current communication occurrence.

4. The method according to claim 2, wherein the first beacon transmits said at least one new individual key and associated derivation code pair only in the case of low current communication occurrence.

5. The method according to claim 1, wherein a pool of pairs of individual keys and associated derivation codes is stored in said onboard unit, and as part of the first communication with the first beacon, said onboard unit selects a pair of an individual key and an associated derivation code from said pool and uses the selected pair for said first communication.

6. The method according to claim 1, wherein the first and second communications occur in accordance with DSRC standard EN15509, or standards based thereon, and the derivation code is a key diversifier of the standard.

7. The method according to claim 5, wherein as part of the first communication with said onboard unit, the first beacon transmits thereto the individual key and the associated derivation code pair, which said onboard unit stores in the pool of pairs of individual keys and associated derivation codes.

8. A method for Dedicated Short-Range Communication (DSRC) communication between a plurality of beacons and one of a plurality of onboard units of a road toll system, the method comprising:
   providing the plurality of the beacons with a system-wide key;
   providing each of the plurality of the onboard units with a respective individual key formed from the system-wide key, respectively on the basis of a derivation code specific to a respective onboard unit;
   upon a first communication from an onboard unit to a first beacon, transmitting the derivation code of said onboard unit to the first beacon to enable the first beacon to emulate the individual key of the onboard unit for encryption/decrypting said first communication with said onboard unit, or for accessing data stored in said onboard unit;
   upon a second communication from said onboard unit to a second beacon, varying the derivation code to obtain a second derivation code; and
   transmitting the second derivation code to the second beacon to enable the second beacon to emulate a second individual key for said onboard unit for encryption/decrypting said second communication with said on board unit, or for accessing data stored in said onboard unit,
   wherein a pair of individual key and associated derivation code is selected randomly or pseudo-randomly from a pool of pairs of individual keys and associated derivation codes in said onboard unit.

9. The method according to claim 8, wherein as part of the first communication with said onboard unit, the first beacon transmits thereto the individual key and the associated derivation code pair, which said onboard unit stores in the pool of pairs of individual keys and associated derivation codes.

10. A method for Dedicated Short-Range Communication (DSRC) communication between a plurality of beacons and one of a plurality of onboard units of a road toll system, the method comprising:
   providing the plurality of the beacons with a system-wide key;
   providing each of the plurality of the onboard units with a respective individual key formed from the system-wide key on the basis of a derivation code specific to a respective onboard unit;
   upon a first communication from an onboard unit to a first beacon, transmitting the derivation code of said onboard unit to the first beacon to enable the first beacon to emulate the individual key of the onboard unit for encryption/decrypting said first communication with said onboard unit, or for accessing data stored in said onboard unit;
   upon a second communication from said onboard unit to a second beacon, varying the derivation code to obtain a second derivation code; and
   transmitting the second derivation code to the second beacon to enable the second beacon to emulate a second individual key for said onboard unit for encryption/decrypting said second communication with said on board unit, or for accessing data stored in said onboard unit,
   wherein a pair of individual key and associated derivation code is selected, according to a rule, from a pool of pairs of individual keys and associated derivation codes in said onboard unit.

* * * * *